3,161,536
PROCESS FOR INCREASING THE SCRATCH RESISTANCE OF GLASS
Robert Harold Dettre, Brandywine Hundred, and Jerry Allen Nelson, Newark, Del., assignors to E. I. du Pont de Nemours and Company, Wilmington, Del., a corporation of Delaware
Filed Dec. 22, 1961, Ser. No. 161,416
6 Claims. (Cl. 117—69)

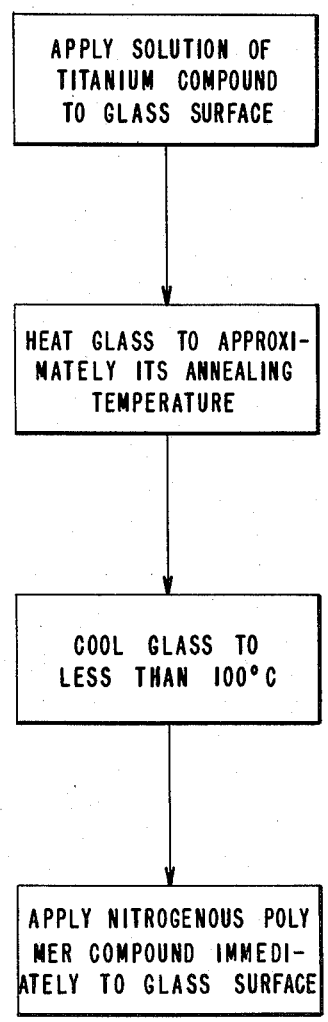
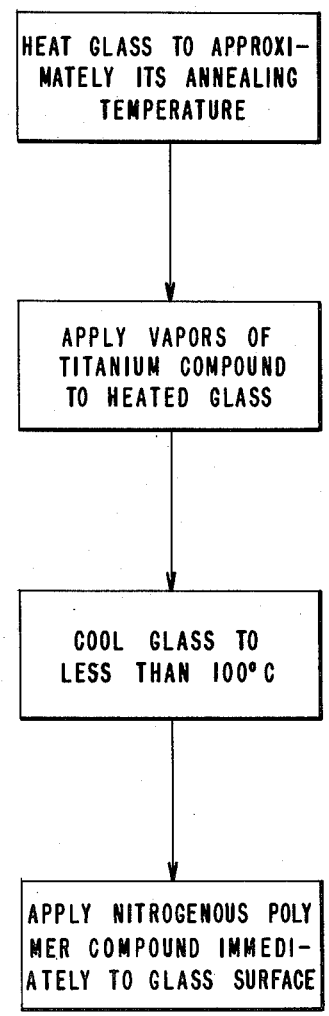

This invention relates to an improved process for increasing the scratch resistance of glass bodies.

The problem and importance of scratch resistance in glass are discussed in detail by Deyrup in U.S. Patent 2,831,780. It is a practical industrial problem and relates to such items as the weakening of glass bottles by rubbing against each other in transit, the marring of window glass through scratches by impinging dust or glass fragments, and the weakening of textile glass fibers by mutual abrasion.

In said patent, Deyrup offers a method for overcoming this deficiency of glass by treating the same with the vapors of a metallo-organic compound at a temperature between the lowest annealing temperature of glass and the temperature at which excessive deformation occurs.

In copending application Serial No. 58,616 (now U.S. Patent 3,051,593) and U.S. Patent No. 3,004,863 of C. L. Gray and R. H. Dettre, processes are described and claimed wherein glass articles are treated with an aqueous solution of certain water-soluble and water-stable ester derivatives of titanium, following which the glass articles are passed through an annealing oven wherein they are heated to a temperature at or near the annealing point, and then allowed to cool to essentially room temperature. Still a third type of titanium compounds is employed in copending application of Brockett, Dettre and Gray, Serial No. 97,757, now Patent No. 3,130,071.

All these processes have the one feature in common that a titanium oxide film is eventually formed in contact with the glass surface which is probably bonded, partially or completely, with the material of the glass through Ti—O—Si links.

As a final step, however, in all the aforegoing processes the articles must be allowed to stand in open air for a period not less than 20 or 30 minutes. Until after this standing period in air, the scratch resistance effect does not seem to develop fully. And although Deyrup has not recognized or taught it in his patent, a standing period in air is essential in his process, too, if a complete and reliable development of the scratch resistant effect is desired.

As has been pointed out in U.S. Patent 3,051,593, the standing in open air for 20 minutes before use is apt to occur automatically with almost any glass article. Nevertheless, the standing step takes on a positive aspect, often with uneconomical side features, when one considers belt line production of articles such as milk bottles. The standing step demands that the belt line be held still for 20 minutes or more so as not to give the bottles a chance to scratch each other in motion before their scratch-resistant coating has become fixed. Where the article produced must be of relatively small cost, such holding up period becomes a matter of material economic significance.

Furthermore, the required length of the standing period may vary from one treatment to another (depending on the type of titanium compound selected for the treatment and perhaps also on the temperature and mode of application of the annealing treatment) and therefore often presents problems in control of the process, inasmuch as one cannot readily determine by mere inspection of the articles whether they have or have not received the proper length of air-curing.

It is accordingly an object of this invention to modify the aforementioned processes of imparting scratch resistance to glass bodies, whereby to eliminate the need of holding the treated bodies still in air for a determined period of time after annealing, and to substitute therefor a positive chemical treatment. Other objects and achievements of this invention will become apparent as the description proceeds.

Now, according to our present invention, the curing period is replaced by a treatment with certain chemical agents as defined below, which treatment can be achieved quickly by immersion, spraying or otherwise coating the annealed glass article with an aqueous solution (or in some cases, an organic solvent solution or a melt) of said chemical agents.

Reference is made to the attached drawing which illustrates by a flow sheet diagram the process of the present invention.

FIGS. 1 and 2 are alternative processes which differ only with respect to the manner of applying the titanium organic compound. In FIG. 1, a solution of the titanium compound is applied to the glass prior to heating; whereas, in the alternative process of FIG. 2, vapors of a titanium compound are applied to the heated glass. The last two steps in the processes of both FIGS. 1 and 2 are the same.

We have found that glass articles which have been treated with organic titanium compounds and annealed, according to said patents or said copending application become satisfactorily scratch resistant if the annealing is followed up with a step of treating said articles with a salt or free-base form of a water-soluble, nitrogenous polymeric compound which possesses in its structure a plurality of aliphatically bound N-atoms, as illustrated by the following commercially available or readily producible polymers:

(1) Polymers of aminoethyl esters of acrylic or methacrylic acid, which may be expressed by the formula

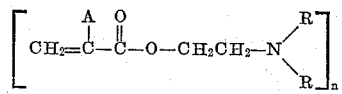

wherein A is H or $CH_3$, either R or each of them is hydrogen or a lower alkyl radical (say 1 to 4 carbon atoms), and $n$ is an integer greater than one but less than 500. Conveniently available examples are: poly(dimethylaminoethyl methacrylate), poly(diethylaminoethyl methacrylate), poly(dimethylaminoethyl acrylate), poly(diethylaminoethyl acrylate), poly(tert-butyl-aminoethyl methacrylate), poly(tert-butylaminoethyl acrylate), poly(aminoethyl methacrylate) and poly(aminoethyl acrylate) and the like. These polymers may also be used as salts with acids such as acetic acid.

(2) Condensation products of long chain aliphatic alcohols, acids or amines with from 2 to 10 moles of ethylene-imine, which may be expressed by the formula

wherein R' is a long chain alkyl radical (of say 12 to 22 C-atoms), X stands for O, CO—O or NH, while $m$ is an integer of from 1 to 10. Suitable examples are the compounds:

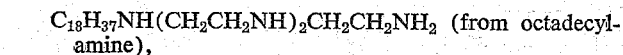
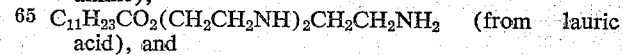
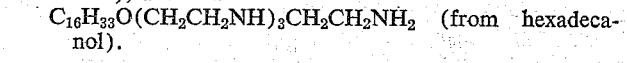

The salts of these compounds with acids, for instance acetic acid, are also usable.

With any of the compounds above discussed, application to the glass articles may be effected from aqueous solution, essentially in the following manner: The glass article is first treated according to the method of said Deyrup patent, said Gray and Dettre patents or the aforementioned copending application, to produce on its surface a coating of titania. As the article emerges from the annealing treatment (which is an essential feature in all the cited processes), it is dipped into or sprayed with an aqueous solution of one or more of the above defined polymeric compounds, and allowed to drain. When the curing agent is the free base form of a condensation product as detailed in paragraph 2 above, application thereof to the glass article after annealing may also be effected from a melt of the curing agent or a solution thereof in an organic solvent. As organic solvents for the last mentioned purpose may be employed any economically available organic liquid which dissolves the curing agent. In general, the higher boiling hydrocarbons are the preferred organic solvents, but others, such as alcohols and acetone are also usable.

Without limitng this invention, the following example is given to illustrate our preferred mode of operation. Percentages mentioned are by weight.

*Example*

Following the procedure of U.S. Patent 3,051,593 to Gray and Dettre, glass botles are dipped into a 10% aqueous solution of triethanolamine titanate (prepared according to Bostwick, U.S. Patent 2,824,114) and the excess solution is allowed to drain from the surface. Alternatively, the solution may be applied to the glass surfaces as a fine spray. The wetted bottles are then slowly heated to 650° C. in an annealing lehr and then cooled slowly to near ambient temperature. On issuing from the lehr, the bottles are dipped into (or sprayed with) a 1% aqueous solution of poly(diethylaminoethyl methacrylate) acetate salt and allowed to drain.

The bottles thus obtained are immediately scratch resistant as may be demonstrated by rubbing two such bottles together with no apparent effect. (If two bottles are rubbed together immediately after leaving the lehr but before treatment with the above solution, they scratch each other easily.)

The poly(diethylaminoethyl methacrylate solution) may be replaced by any of the above named compounds (or a mixture of two or more such compounds), in aqueous solution, with similar results.

The solutions used above may also be replaced with any one of the ethyleneimine condensation products mentioned above in base form and liquid state, for instance in the form of a melt or a solution in an organic solvent, as hereinabove discussed.

Where nonaqueous solutions are employed, the glass objects are afterwards rinsed with water. This is merely to remove any excess material which may be present and is not essential to the process.

In the above example, the treatment prior to annealing was done with triethanolamine titanate, in accordance with U.S. Patent 3,051,593 to Gray and Dettre. Equally successful results are obtained if this treatment is done with an aqueous solution of diisopropyl diacetoacetonyl titanate (as in the Gray and Dettre patent, No. 3,004,638), or with an aqueous solution of a water-soluble titanium lactate complex (as in copending application of Brockett, Dettre and Gray, Serial No. 97,757), or with vapors of tetraisopropyl titanate (as in Deyrup, U.S. Patent 2,831,780), or again if the bottles are dipped in or sprayed with heptane solutions of dihydroxy-bis(2-ethyl-1,3-hexanediol) titanate, poly(dibutyl titanate) or tetrakis(2-ethyl-1,3-hexanediol) titanate and then heated to the annealing temperature as taught in the above mentioned references. None of these methods produce glass surfaces which are scratch resistant immediately on leaving the annealing lehr but they become so on treatment according to this invention.

As an added advantage of the treatment constituting this invention, it has been found that glass articles produced by the present process are more scratch resistant than those produced by the methods of the aforementioned patents and copending application even though the air-curing step above described has been applied to the titanium-treated glass.

The resistance to scratching of a glass surface can be measured by drawing a glass rod across the surface and measuring the weight or tension which must be applied to the rod to produce a scratch. In this manner, the higher scratch resistance produced by the present process can be readily demonstrated.

Treatment with the special agents of this invention of a glass object which does not have a preformed titania coating with the compounds defined in the aforementioned patents or in said copending application, imparts to said glass objects a hydrophobic surface but not scratch resistance to any degree.

The scratch resistant glass surfaces produced according to the present invention are durable to washing with water, but not to washing with aqueous solutions of anionic detergents, such as the alkali metal salts of long chain alkyl sulfates or alkyl or alkaryl sulfonates. However, where an article has been washed with such a detergent, the scratch-resistant surface thereon can be reformed by treating the article again, in one of the aforegoing manners, with one of the polymeric agents mentioned in this specification. (In other words, the curing treatment is repeated on the washed article, but there is no need for repeating the treatment with a titanium ester or the annealing operation.)

It will be understood that the details of procedure above set forth may be varied widely within the skill of those engaged in this art.

For instance, the temperature to which the glass is allowed to cool in the annealing lehr need not drop below the temperature at which the curing treatment is intended to be applied, and may indeed be considerably higher so long as there is no danger of shattering the glass object by abrupt cooling during the curing treatment. Altogether, the several modes of application of the curing treatment of this invention may vary in temperature from room temperature to 120° C., while the temperature of the glass just prior to the curing treatment may be some 50° C. higher than the temperature of the applied solution or melt.

We claim as our invention:

1. In a process for increasing the scratch resistance of glass by applying an organo-titanium compound to the surface of the glass, which is in non-fibrous form, heating the glass, and then allowing the glass to stand in air for a period of not less than 20 minutes to develop the desired scratch resistance, the improvement which comprises eliminating the standing period required to develop scratch resistance by coating the surface of the glass, immediately after the heating step and at a temperature between room temperature and 120° C., with a nitrogenous polymeric compound selected from the group consisting of nitrogenous polymeric bases and their acetate salts, said nitrogenous polymeric bases being water-soluble compounds of the structural formula selected from the group consisting of (1) 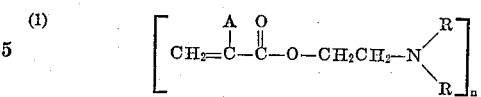

where A is from the group consisting of H and $CH_3$;
R is from the group consisting of H and $C_1$ to $C_4$ alkyl radicals; and
$n$ is an integer greater than 1 and less than 500, and (2)   $R'—X—(CH_2CH_2NH)_m—CH_2CH_2NH_2$ where $R'$ is a $C_{12}$ to $C_{22}$ alkyl radical;

X is from the group consisting of O, COO, and NH; and *m* is an integer of from 1 to 10.

2. The process of claim 1 wherein the nitrogenous polymeric base has said formula (1) 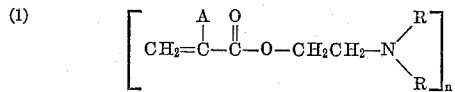

3. The process of claim 1 wherein the nitrogenous ploymeric base has said formula (2) 

4. The process of claim 1 wherein the nitrogenous polymeric compound is applied to the glass from an aqueous solution of said compound.

5. The process of claim 1 wherein the nitrogenous polymeric compound is applied to the glass from a solution of said compound in an organic solvent.

6. The process of claim 1 wherein the nitrogenous polymeric compound is applied to the glass in molten form.

References Cited in the file of this patent

UNITED STATES PATENTS

| | | |
|---|---|---|
| 2,544,772 | Audrieth et al. | Mar. 13, 1951 |
| 2,563,289 | Steinman | Aug. 7, 1951 |
| 2,584,763 | Waggoner | Feb. 5, 1952 |
| 2,671,033 | Waggoner | Mar. 2, 1954 |
| 3,004,863 | Gray et al. | Oct. 17, 1961 |
| 3,051,593 | Gray et al. | Aug. 28, 1962 |

FOREIGN PATENTS

| | | |
|---|---|---|
| 461,354 | Great Britain | Feb. 15, 1937 |